(12) United States Patent
Ikenishi et al.

(10) Patent No.: US 7,601,446 B2
(45) Date of Patent: *Oct. 13, 2009

(54) SUBSTRATE FOR INFORMATION RECORDING MEDIUM, INFORMATION RECORDING MEDIUM AND METHOD FOR MANUFACTURING SAME

(75) Inventors: Mikio Ikenishi, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 10/505,282

(22) PCT Filed: Oct. 29, 2003

(86) PCT No.: PCT/JP03/13846

§ 371 (c)(1),
(2), (4) Date: Aug. 20, 2004

(87) PCT Pub. No.: WO2004/041740

PCT Pub. Date: May 21, 2004

(65) Prior Publication Data

US 2005/0162956 A1 Jul. 28, 2005

(30) Foreign Application Priority Data

Nov. 7, 2002 (JP) ............................. 2002-323275

(51) Int. Cl.
- *G11B 5/65* (2006.01)
- *C03C 3/17* (2006.01)
- *C03C 3/21* (2006.01)
- *C03C 19/00* (2006.01)

(52) U.S. Cl. ...................... 428/846.9; 501/27; 501/102; 65/33.4

(58) Field of Classification Search .............. 428/846.9, 428/848, 848.2, 848.3, 848.8, 409, 410, 426, 428/64.2, 848.4; 65/404, 33.1, 33.4; 438/691; 501/54, 55, 27, 53, 102, 154, 96.1

See application file for complete search history.

(56) References Cited

U.S. PATENT DOCUMENTS

| | | | |
|---|---|---|---|
| 5,391,622 A | | 2/1995 | Ho et al. |
| 5,499,731 A | * | 3/1996 | Marshall ................... 216/22 |
| 5,895,583 A | * | 4/1999 | Augustine et al. ............. 216/53 |
| 6,162,751 A | | 12/2000 | Speit et al. |
| 6,387,510 B1 | | 5/2002 | Nakashima et al. |
| 6,395,634 B1 | * | 5/2002 | Miyamoto .................. 438/691 |
| 6,426,311 B1 | * | 7/2002 | Goto et al. ............... 428/846.4 |
| 6,440,531 B1 | | 8/2002 | Kurachi et al. |
| 6,599,606 B1 | * | 7/2003 | Zou ......................... 428/64.2 |
| 2002/0010066 A1 | | 1/2002 | Nakashima et al. |
| 2006/0216552 A1 | * | 9/2006 | Ikenishi et al. ........... 428/846.9 |

FOREIGN PATENT DOCUMENTS

| | | |
|---|---|---|
| JP | 01-239036 | 9/1989 |
| JP | 10-158028 | 6/1998 |
| JP | 2001-294441 | 10/2001 |
| JP | 2002-160943 | * 6/2002 |
| JP | 2002-201040 | * 7/2002 |
| JP | 2002-358626 | 12/2002 |

OTHER PUBLICATIONS

Translation JA 2001-294441.*
Translation JA 10-158028.*
JA 2002-201040—translation.*
JA 2002-160943—translation.*

* cited by examiner

*Primary Examiner*—D. Lawrence Tarazano
*Assistant Examiner*—Louis Falasco
(74) *Attorney, Agent, or Firm*—Nixon & Vanderhye P.C.

(57) ABSTRACT

A substrate for an information recording medium, which has high heat resistance and high acid resistance and is formed of a glass having a glass transition temperature (Tg) of 600° C. or higher and having an etching rate of 0.1 μm/minute or less with regard to a hydrosilicofluoric acid aqueous solution that is maintained at a temperature of 45° C. and has a hydrosilicofluoric acid concentration of 1.72% by weight, and an information recording medium having an information recording layer formed on the above substrate.

14 Claims, No Drawings

SUBSTRATE FOR INFORMATION RECORDING MEDIUM, INFORMATION RECORDING MEDIUM AND METHOD FOR MANUFACTURING SAME

This application is the US national phase of international application PCT/JP03/013846 filed 29 Oct. 2003, which designated the US and claims priority to JP Application No. 2002-325289 filed 07 Nov. 2002. The entire contents of these applications are incorporated herein by reference.

TECHNICAL FIELD

The present invention relates to a substrate for an information recording medium, an information recording medium and a process for manufacturing the information recording medium. More specifically, the present invention relates to a highly heat-resistant and highly acid-resistant substrate for an information recording medium, an information recording medium to which the above substrate is applied, particularly to a substrate for a magnetic recording medium, which substrate is suitable for forming a magnetic film for a perpendicular-magnetic-recording-mode information recording medium with a high-temperature sputtering apparatus, such an information recording medium and a process for manufacturing such an information recording medium.

BACKGROUND ART

Conventionally, aluminum, glass, ceramic, and the like are used as a substrate material for a magnetic recording medium. At present, aluminum and glass are mainly practically used depending upon sizes and uses. Of these, the use of a glass substrate is expanding year after year since it is almost free of a surface defect and is excellent in surface flatness and smoothness and surface hardness. As a glass for use as a substrate for a magnetic recording medium, a glass chemically strengthened by ion exchange and a crystallized glass are known. As a chemically strengthened glass, for example, JP-A-1-239036 discloses a chemically strengthened glass substrate having, in the vicinity of the glass surface, a compression stress layer formed by subjecting a glass containing, by weight %, 50 to 85% of $SiO_2$, 0.5 to 14% of $Al_2O_3$, 10 to 32% of $R_2O$ (in which R is an alkali metal ion), 1 to 15% of ZnO and 1.1 to 14% of $B_2O_3$ to ion-exchange with an alkali ion.

Further, as a crystallized glass, for example, U.S. Pat. No. 5,391,622 discloses a crystallized-glass substrate for a magnetic disk, which glass substrate contains, by weight %, 65 to 83% of $SiO_2$, 8 to 13% of $Li_2O$, 0 to 7% of $K_2O$, 0.5 to 5% of MgO, 0 to 5% of ZnO, 0 to 5% of PbO, the content of MgO+ZnO+PbO being 0.5 to 5%, 1 to 4% of $P_2O_5$, 0 to 7% of $Al_2O_3$ and 0 to 2% of $As_2O_3+Sb_2O_3$ and contains fine $Li_2O\cdot2SiO_2$ crystal grains as a main crystal.

In recent years, however, with developments in higher-density recording, information recording devices such as a magnetic disk typified by a disk of a hard disk drive are required to cope with a conversion from a longitudinal recording mode to a perpendicular recording mode. The problem pointed out with regard to the longitudinal recording mode is as follows. A magnetic domain is easily inverted due to a heat such as the heat of a room temperature. With an increase in density, writing is no longer possible, and written data is easily lost. The above phenomenon is known as a heat fluctuation problem, and is coming to be a bar against the longitudinal recording mode. For coping with the heat fluctuation problem in the longitudinal recording mode, studies are being actively made in recent years for applying a perpendicular recording mode to practical use.

The film constitution that is known with regard to the above perpendicular magnetic recording mode includes a single-layered film in which a perpendicular magnetic recording layer is formed on a non-magnetic substrate, a two-layered film in which a soft magnetic layer and a magnetic recording layer are consecutively stacked and a three-layered film in which a hard magnetic layer, a soft magnetic layer and a magnetic recording layer are consecutively stacked. Of these, the two-layered film and the three-layered film are suitable for attaining high-density recording and maintaining the stability of a magnetic moment, so that developments are being actively made for their practical application. For improving the properties of a perpendicular magnetic recording medium of the above multi-layered magnetic film, it is said that it is required to form the film with a high-temperature sputtering apparatus or to heat-treat the formed film at a high temperature.

However, an aluminum substrate that has been generally used so far has a low heat resistance of 280° C. or lower. Further, when a conventional chemically strengthened glass is used at a temperature in a chemical strengthening temperature range (350-420° C.) or a temperature higher than such a range, a surface stress caused by ion exchange for the chemical strengthening is relaxed, and the substrate strength sharply decreases, so that it is generally required to use a chemically strengthened glass at a temperature of 350° C. or lower. In the perpendicular magnetic recording mode, it is required to form a film with a sputtering machine at a high temperature of 400° C. or higher or anneal the film of stacked magnetic layers at a temperature of 400° C. or higher, for improving a magnetic film in magnetic characteristic. It is therefore clear that none of aluminum substrates and chemically strengthened glass substrates commercially available at present can cope with the above requirement, and a glass substrate having high heat resistance is demanded.

For attaining excellent heat resistance, a glass material that does not contain any alkali metal oxide so far essential for a chemically strengthened glass may be taken into account. In this case, however, there is caused a problem that the meltability of such a glass decreases since the glass viscosity during melting increases. Further, when a magnetic disk is incorporated into a drive unit, it is required to impart a glass substrate with a larger thermal expansion coefficient for conforming the thermal expansion coefficient of the glass substrate to the counterpart of a metal fixing member to fix a disk. However, it is difficult to impart a glass containing no alkali metal oxide with the thermal expansion coefficient that a substrate for an information recording medium is required to have.

For attaining a high recording density of an information recording medium, the employment of the above perpendicular magnetic recording mode only is not sufficient, and how closely a read/write head can be brought close to the medium surface is also another problem to solve. The distance between the above head and the medium surface is called a flying height, and the flying height can be decreased only when a high surface flatness and smoothness can be attained for a substrate as a base for an information recording medium and when a substance adhering to the substrate surface can be reduced.

For a substrate made of a glass for an information recording medium, a glass is processed into a substrate having a flat and smooth surface by polishing and lapping. However, polishing grains used for the polishing and fine glass dust scraped from the glass are adhering to the surface of the thus-processed glass substrate. Therefore, the processed substrate is immersed and cleaned in an acid thereby to remove a surface soiling and a very thin layer of the surface by etching.

However, when a glass has low durability against the acid used for the cleaning, the acid roughens the surface of a substrate made of the glass, and the high surface flatness and smoothness obtained by the polishing are inevitably impaired in return for the surface cleanness.

That is, for attaining a high recording density of an information recording medium, it is required to provide a glass material that not only permits bringing of a substrate surface into a clean state by cleaning it with an acid but also prevents the above cleaning from roughening a smooth surface, and which is not deformed by the high-temperature treatment.

DISCLOSURE OF THE INVENTION

Under the circumstances, it is an object of the present invention to provide a substrate for an information recording medium, which substrate has high heat resistance and high acid resistance sufficient for satisfying the above requirements and an information recording medium to which the above substrate is applied, particularly, a substrate for a magnetic recording medium, which substrate is suitable for forming a magnetic film for a perpendicular-magnetic-recording-mode information recording medium with a high-temperature sputtering apparatus, and an information recording medium to which such a substrate is applied.

For achieving the above object, the present inventors have made diligent studies and as a result found that the above object can be achieved by a substrate for an information recording medium, which substrate is formed of a glass having a certain glass transition temperature (Tg) or higher and having a certain etching rate or lower when the glass in immersed in an acid under specific conditions. On the basis of the above finding, the present invention has been completed.

(1) a substrate for an information recording medium, which is formed of a glass having a glass transition temperature (Tg) of 600° C. or higher and having an etching rate of 0.1 μm/minute or less with regard to a hydrosilicofluoric acid aqueous solution that is maintained at a temperature of 45° C. and has a hydrosilicofluoric acid concentration of 1.72% by weight, (2) a substrate for an information recording medium as recited in the above (1), wherein the glass contains $SiO_2$, $Al_2O_3$, CaO and $K_2O$ as essential components, (3) a substrate for an information recording medium as recited in the above (2), wherein the glass has a composition comprising, by mol %, 45 to 70% of $SiO_2$, 1 to 15% of $Al_2O_3$, the total content of $SiO_2$ and $Al_2O_3$ being 57 to 85%, 2 to 25% of CaO, 0 to 15% of BaO, 0 to 15% of MgO, 0 to 15% of SrO, 0 to 10% of ZnO, the total content of MgO, CaO, SrO, BaO and ZnO being 2 to 30%, more than 0% but not more than 15% of $K_2O$, 0 to 8% of $Li_2O$, 0 to 8% of $Na_2O$, the total content of $K_2O$, $Li_2O$ and $Na_2O$ being 2 to 15%, 0 to 12% of $ZrO_2$ and 0 to 10% of $TiO_2$, the total content of said components being at least 95%, (4) a substrate for an information recording medium as recited in the above (1), wherein the glass contains $SiO_2$, $Al_2O_3$, CaO, $Na_2O$ and $K_2O$ and has a chemically strengthened layer, (5) a substrate for an information recording medium as recited in the above (4), wherein the glass has a composition comprising, by mol %, 47 to 70% of $SiO_2$, 1 to 10% of $Al_2O_3$, the total content of $SiO_2$ and $Al_2O_3$ being 57 to 80%, 2 to 25% of CaO, 1 to 15% of BaO, 1 to 10% of $Na_2O$, more than 0% but not more than 15% of $K_2O$, 0 to 3% of $Li_2O$, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, the ratio of the content of CaO to the total content of MgO, CaO, SrO and BaO being at least 0.5, and 0 to 10% of $TiO_2$, the total content of said components being at least 95%, (6) a substrate for an information recording medium as recited in the above (1), wherein the glass contains $SiO_2$, $Al_2O_3$, CaO, BaO, $Na_2O$ and $ZrO_2$ as essential components and has a chemically strengthened layer, (7) a substrate for an information recording medium as recited in the above (6), wherein the glass has a composition comprising, by mol %, 47 to 70% of $SiO_2$, 1 to 10% of $Al_2O_3$, the total content of $SiO_2$ and $Al_2O_3$ being 57 to 80%, 2 to 25% of CaO, 1 to 15% of BaO, 1 to 10% of $Na_2O$, 0 to 15% of $K_2O$, 0 to 3% of $Li_2O$, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, the ratio of the content of CaO to the total content of MgO, CaO, SrO and BaO being at least 0.5, and 0 to 10% of $TiO_2$, the total content of said components being at least 95%, (8) a substrate for an information recording medium as recited in any one of the above (1) to (7), which is for use in a perpendicular-magnetic-recording-mode information recording medium, (9) an information recording medium having an information recording layer formed on the substrate for an information recording medium recited in any one of the above (1) to (8),

(10) an information recording medium as recited in the above (8), which is a perpendicular-magnetic-recording-mode magnetic recording medium, and

(11) a process for manufacturing an information recording medium, which comprises the step of forming an information recording layer on a substrate for an information recording medium and uses the substrate for an information recording medium recited in any one of the above (1) to (8) as said substrate, said step comprising the procedure of heating said substrate to a temperature of 300 to 600° C.

BEST MODES FOR PRACTICING THE INVENTION

The substrate for an information recording medium, provided by the present invention, is a substrate suitable for forming a film thereon at a high temperature in the range of 400 to 600° C. The above substrate is formed of an amorphous glass that is not deformed even in heat-treatment at a high temperature in the range of 300 to 600° C., preferably 400 to 600° C., and which has excellent acid resistance.

For preventing the deformation of the substrate under the above high-temperature heat treatment, the substrate is constituted of a glass having a glass transition temperature (Tg) of 600° C. or higher, preferably 620° C. or higher, more preferably 650° C. or higher, still more preferably 680° C. or higher, particularly preferably 700° C. or higher. Although not specially limited, the upper limit of the glass transition temperature of the above glass is generally approximately 900° C.

The substrate for an information recording medium, provided by the present invention, includes a chemically strengthened substrate and a chemically non-strengthened substrate having no chemically strengthened layer. Concerning the chemically strengthened substrate, when a glass therefor has a high glass transition temperature, it is required to carry out the chemical strengthening at a higher temperature.

When the temperature for the chemical strengthening is high, a molten salt used for the chemical strengthening starts to decompose, and a decomposition product may roughen the substrate surface. Therefore, preferably, the glass transition temperature of a glass for the chemically strengthened substrate is adjusted to 800° C. or lower so that the temperature for the chemical strengthening may not come to be high to excess.

The substrate for an information recording medium, provided by the present invention, is formed of a glass which exhibits acid resistance, that is, has an etching rate of 0.1 μm/minute or less with regard to a hydrosilicofluoric acid aqueous solution that is maintained at a temperature of 45° C. and has a hydrosilicofluoric acid concentration of 1.72% by weight. The above concentration of the hydrosilicofluoric acid aqueous solution is a concentration suitable for evaluation of the acid resistance of a glass material but not any concentration of an acid to be used for cleaning the substrate. When the above etching rate is 0.1 μm/minute or less, a substance adhering to the substrate surface can be effectively removed by cleaning with an acid, and the flatness and smoothness of the substrate can be maintained in an excellent state. When the above etching rate exceeds 0.1 μm/minute, the surface of a substrate is clouded to be white by cleaning with an acid, and the cleanness and the surface flatness and smoothness of the substrate are impaired.

The above etching rate is preferably in the range that does not exceeds 0.08 μm/minute, more preferably in the range that does not exceeds 0.06 μm/minute. When it is taken into account that a very thin layer of the substrate surface is uniformly removed by the cleaning with an acid, the above etching rate is further preferably at least 0.001 μm/minute. In the evaluation of the etching rate, preferably, a surface on which an information recording layer is to be formed or a clean surface that has been polished to a level of the above surface is evaluated for an etching rate.

For carrying out excellent cleaning while maintaining a high surface flatness and smoothness, it is preferred to use a hydrosilicofluoric acid aqueous solution for the cleaning of a substrate with an acid. However, the cleaning may be carried out with other acid such as hydrofluoric acid. That is, the index of the acid resistance based on the etching rate to the hydrosilicofluoric acid aqueous solution can also work as an index for carrying out excellent cleaning with other acid.

When a glass substrate is to be chemically strengthened, preferably, the glass substrate before the chemical strengthening and the glass substrate after the chemical strengthening show the same etching rate values. In a chemically strengthened substrate, the concentration distribution of an alkali metal ion is formed in the depth direction due to ion exchange. It is considered that a glass that shows little difference between the above etching rates before and after the chemical strengthening gives a constant etching rate even when it has the above concentration distribution. Even when a substrate has a chemically strengthened layer, therefore, the condition of the cleaning with an acid can be easily determined, and there can be suppressed a decrease in the surface flatness and smoothness caused by the variability of the etching rate. The change in the above etching rate (absolute value of a value obtained by dividing a difference between etching rates before and after the chemical strengthening by an etching rate before the chemical strengthening) is preferably in the range of 0 to 0.1, preferably 0 to 0.05.

The composition of the glass for constituting the substrate for an information recording medium, provided by the present invention, will be explained below. Any glass composition can be used so long as the above properties can be attained. When the acid resistance to the hydrosilicofluoric acid aqueous solution is taken into account, however, a glass composition having a larger content of $SiO_2$ is preferred, and a glass composition whose $SiO_2$ content is largest is more preferred.

Further, a glass composition containing a $SiO_2$, $Al_2O_3$, CaO and $K_2O$ as essential component (to be referred to as "glass I" hereinafter) is preferred. The above glass composition can give a substrate for an information recording medium having all of high heat resistance, a high expansion property and high glass stability. In the above glass composition, $SiO_2$ and $Al_2O_3$ work to increase the glass transition temperature. CaO works to stabilize the glass. $K_2O$ works to improve the glass in meltability, and as an alkali metal oxide, the activity of $K_2O$ decreasing the glass transition temperature is low. $K_2O$ is a component essential for bringing the thermal expansion coefficient of the glass into a range suitable for a substrate for an information recording medium.

The above glass composition preferably contains, by mol % [contents (%) of glass components stands for mol % unless otherwise specified hereinafter], 45 to 70% of $SiO_2$, 1 to 15% of $Al_2O_3$, the total content of $SiO_2$ and $Al_2O_3$ being 57 to 85%, 2 to 25% of CaO, 0 to 15% of BaO, 0 to 15% of MgO, 0 to 15% of SrO, 0 to 10% of ZnO, the total content of MgO, CaO, SrO, BaO and ZnO being 2 to 30%, more than 0% but not more than 15% of $K_2O$, 0 to 8% of $Li_2O$, 0 to 8% of $Na_2O$, the total content of $K_2O$, $Li_2O$ and $Na_2O$ being 2 to 15%, 0 to 12% of $ZrO_2$ and 0 to 10% of $TiO_2$, the total content of said components being at least 95%. In the above glass composition, the ratio of the content of CaO to the total content of MgO, CaO, SrO and BaO (CaO/(MgO+CaO+SrO+BaO)) is preferably 0.5 or more, more preferably 0.55 or more, still more preferably 0.6 or more.

The functions and contents of the above glass components will be explained in detail below.

$SiO_2$ is a main component for forming a glass network structure, and when its content is less than 45%, the durability of the glass is degraded, and the glass is liable to devitrify. When the content of $SiO_2$ exceeds 70%, the Young's modulus of the glass is low, and the high-temperature viscosity of the glass increases, so that it is difficult to melt the glass. The content of $SiO_2$ is therefore preferably in the range of 45 to 70%, particularly preferably in the range of 50 to 67%.

$Al_2O_3$ is very important not only as a component that greatly works to improve the glass in durability and heat resistance but also as a component that stabilizes a glass network structure and its rigidity together with $SiO_2$. When its content is less than 1%, the effect of suppressing the elution of an alkali from the glass tends to decrease, and it is difficult to make a glass having excellent durability. When the content of $Al_2O_3$ exceeds 15%, the glass tends to have poor high-temperature meltability. Therefore, the content of $Al_2O_3$ is preferably in the range of 1 to 15%, more preferably 2 to 12%.

The total content of the above $SiO_2$ and $Al_2O_3$ is preferably in the range of 57 to 85%. When the above total content is less than 57%, the glass may have insufficient durability. The above total content is preferably in the range of 57 to 79%.

MgO, CaO, ZnO, SrO and BaO decrease the viscosity and promote melting when the glass is melted. Further, they have a great effect on increasing the Young's modulus of the glass and increasing the thermal expansion coefficient. However, the total content of these exceeds 30%, the glass tends to be degraded in durability, and the devitrification temperature of the glass tends to be high.

CaO is an important component for improving the glass in Young's modulus and decreasing the melt viscosity. However, when the content of CaO is less than 2%, the above effects are small. When the content thereof exceeds 25%, the stability of the glass tends to be degraded. The content of CaO is therefore preferably in the range of 2 to 25%, more preferably 3 to 20%.

BaO works to improve the glass in thermal expansion coefficient and has an effect on improving the glass in durability. However, when it is incorporated to excess, the durability tends to be degraded to the contrary. Further, when BaO is incorporated, the specific gravity of the glass greatly increases. Therefore, the content of BaO is preferably in the range of 0 to 15%, more preferably 0 to 14%.

In addition, when MgO, ZnO and SrO are added in a total content within a proper range, it can be expected that they have an effect on improving the glass in stability of the glass structure and Young's modulus and increasing the thermal expansion coefficient of the glass. The above effect is greater when MgO, ZnO and SrO as divalent components are added together in a small amount each than when one of them is added in a large amount. Therefore, preferably, the content of MgO is in the range of 0 to 15%, the content of SrO is in the range of 0 to 15%, and the content of ZnO is in the range of 0 to 10%. More preferably, the content of MgO is 0 to 10%, the content of SrO is 0 to 10%, and the content of ZnO is 0 to 8%.

For the above reasons, the total content of MgO, CaO, SrO, BaO and ZnO is preferably in the range of 2 to 30%, more preferably in the range of 3 to 30%, still more preferably in the range of 3 to 25%.

$Li_2O$, $Na_2O$ and $K_2O$ are useful components for decreasing the melt viscosity of the glass and promoting the melting of the glass and for increasing the thermal expansion coefficient of the glass to a great extent. However, when the total content of these components exceeds 15%, not only the glass is degraded in chemical durability, but also an alkali often comes to precipitate on a glass surface, so that the alkali may corrode an information recording layer such as a magnetic film. Further, the glass transition temperature may decrease, and it may be impossible to attain the required heat resistance. When the total content of these components is less than 2%, the meltability of the glass decreases, and it is difficult to obtain predetermined thermal expansion properties.

While $Li_2O$ has a great effect on increasing the thermal expansion coefficient and the Young's modulus of the glass, it precipitates on a glass surface to a great extent, so that the content thereof is preferably 0 to 8%, more preferably 0 to 5%. Still more preferably 0 to 3%, particularly preferably $Li_2O$ is not contained.

While $Na_2O$ has a great effect on increasing the thermal expansion coefficient of the glass, the above effect is not so great as that produced by $K_2O$. Further, it precipitates on a glass surface to a great extent. Therefore, the content of $Na_2O$ is preferably 0 to 8%, more preferably 0 to 5%.

$K_2O$ has a great effect on increasing the thermal expansion coefficient of the glass, and the degree of its precipitation on a glass surface is small, so that $K_2O$ is an important component. That is, for imparting the glass with desired thermal expansion properties and meltability but maintaining the alkali elution amount at a low level, $K_2O$ is an important component. However, when $K_2O$ is incorporated in a large amount, it degrades the glass in durability, and it also causes the heat resistance of the glass to decrease due to a decrease in glass transition temperature. Therefore, the content of $K_2O$ is preferably in the range of more than 0% but not more than 15%, more preferably 0.5 to 15%, still more preferably 2 to 15%, particularly preferably 4 to 12%.

For the above-described reasons, the total content of $K_2O$, $Li_2O$ and $Na_2O$ is preferably in the range of 2 to 15%, more preferably in the range of 4 to 12%.

$ZrO_2$ and $TiO_2$ are components that are incorporated for improving the glass in chemical durability and rigidity. When $ZrO_2$ and $TiO_2$ are added in a small amount, the glass is improved in all of durability, elastic modulus and fragility. However, the specific gravity of the glass sharply increases, and when they are incorporated in a large amount, the tendency of the glass to devitrify is intensified.

While $ZrO_2$ is a component for increasing the Young's modulus, the specific gravity of the glass increases. Therefore, the content of $ZrO_2$ is preferably 0 to 12%, more preferably 0 to 10%.

The effect of $TiO_2$ on increasing the Young's modulus is inferior to the effect of $ZrO_2$, but the specific gravity of the glass does not increase much. Therefore, the content of $TiO_2$ is preferably 0 to 10%, more preferably 0 to 8%.

The glass substrate of the present invention may contain a rare earth metal element as an optional component. The rare earth metal element works to improve the glass substrate in heat resistance, durability and elastic modulus, while it is an expensive material. The substrate of the present invention can be further classified into two embodiments depending upon whether or not the rare earth metal element is contained.

One embodiment is a rare-earth-metal-element-free glass substrate that can be provided as a low-cost glass substrate while satisfying the requirements of high heat resistance properties, high thermal expansion properties and low alkali elution properties. The other embodiment is a rare-earth-metal-element-containing glass substrate that can be imparted with higher heat resistance, a higher Young's modulus and higher durability while satisfying high thermal expansion properties and low alkali elution properties. In the latter embodiment, the content of the rare earth metal element as an oxide is preferably 8% or less, more preferably 5% or less.

Examples of the above rare earth metal element include Y, La, Gd, Yb, Pr, Sc, Sm, Tb, Dy, Nd, Eu, Ho, Er, Tm and Lu. Examples of the oxides thereof include $Y_2O_3$, $La_2O_3$, $Gd_2O_3$, $Yb_2O_3$, $Pr_2O_3$, $Sc_2O_3$, $Sm_2O_3$, $Tb_2O_3$, $Dy_2O_3$, $Nd_2O_3$, $Eu_2O_3$, $Ho_2O_3$, $Er_2O_3$, $Tm_2O_3$ and $Lu_2O_3$.

As an oxide of the above rare earth metal element, $Y_2O_3$ is preferred. When $Y_2O_3$ is used, the specific gravity of the glass does not much increase, and there is produced a great effect on increasing the Young's modulus of the glass. Since, however, the stability of the glass decreases to a great extent, the content of $Y_2O_3$ is preferably 8% or less, more preferably 5% or less.

In addition to the above components, the glass substrate of the present invention may contain $As_2O_3$, $Sb_2O_3$, a fluoride, a chloride and $SO_3$ for improving the glass in meltability, clarity and moldability. While the content of these components can be in a range suitable for use as a defoaming or clarifying agent, the total content of these as an index is 2% or less based on the total content of the glass components excluding these. $Sb_2O_3$ as well as $As_2O_3$ has an excellent defoaming or clarifying effect over any other one of the above defoaming agents. When a glass for constituting a substrate for an information recording medium has not been fully defoamed or clarified, fine gas bubbles remain in the glass. When such a glass is polished and lapped, gas bubbles remaining in the glass come to appear on the surface to form dents. The surface of a substrate for an information recording medium is required to have very high flatness and smoothness, and a glass having such remaining gas bubbles gives a defective product. It is therefore desirable to incorporate $Sb_2O_3$ or $As_2O_3$ in an amount of 0.1 to 2% by weight based on the total content of the glass components excluding these. However, when an adverse effect on environments is taken into account, desirably, an arsenic compound such as $As_2O_3$ is not incorporated. It is therefore desirable to incorporate $Sb_2O_3$ alone. The content of $Sb_2O_3$ is preferably 0.1 to 2% by weight, more preferably 0.1 to 1% by weight based on the total content of the glass components excluding these.

A glass containing $As_2O_3$ or $Sb_2O_3$ is not suitable for float shaping, since $As_2O_3$ or $Sb_2O_3$ in the glass is liable to react with molten metals such as tin. It is therefore preferred to employ not a float shaping method but a press shaping method for manufacturing a substrate for an information recording medium.

A glass having a more preferred composition can be selected by combining the above glass components in more preferred amount ranges out of the above preferred amount ranges. Above all, a particularly preferred glass has a composition comprising 50 to 67% of $SiO_2$, 2 to 12% of $Al_2O_3$, the total content of $SiO_2$ and $Al_2O_3$ being 57 to 79%, 3 to 20% of CaO, 0 to 14% of BaO, 0 to 10% of MgO, 0 to 10% of SrO, 0 to 8% of ZnO, the total content of MgO, CaO, SrO, BaO and ZnO being 3 to 30%, 0 to 5% of $Li_2O$, 0 to 5% of $Na_2O$, 0.5 to 15% of $K_2O$, the total content of $K_2O$, $Li_2O$ and $Na_2O$ being 4 to 12%, 0 to 10% of $ZrO_2$ and 0 to 8% of $TiO_2$.

In the embodiment of the glass composition containing no rare earth metal element, preferably, the total content of $SiO_2$, $Al_2O_3$, CaO, BaO, MgO, SrO, ZnO, $Li_2O$, $Na_2O$, $K_2O$, $ZrO_2$ and $TiO_2$ is 100%. Further, the above composition may contain the above defoaming agent. For suppressing the alkali elution amount and for attaining excellent meltability and heat resistance, it is desirable to limit the alkali metal oxide to $K_2O$ alone. For attaining the above properties, it is also desirable to allow the glass to contain $K_2O$ and BaO together. The total content of $SiO_2$, $Al_2O_3$, CaO, BaO, MgO, $K_2O$ and $ZrO_2$ in the composition is preferably 98% or more, more preferably 99% or more, particularly preferably 100%. The above glass composition may contain the above defoaming agent.

In the embodiment of the glass composition containing a rare earth metal element, preferably the total content of $SiO_2$, $Al_2O_3$, CaO, BaO, MgO, SrO, ZnO, $Li_2O$, $Na_2O$, $K_2O$, $ZrO_2$, $TiO_2$, $B_2O_3$ and rare earth metal oxide(s) is 100%. Above all, the total content of the rare earth metal oxides is preferably 5% or less. The above glass composition may contain a proper amount of $As_2O_3$, $Sb_2O_3$, a fluoride, a chloride and $SO_3$, and the total content of these is preferably 2% by weight or less based on the total content of the glass components excluding these. However, when an adverse effect on environments is taken into account, desirably, an arsenic compound such as $As_2O_3$ is not incorporated. $Sb_2O_3$ is the most desirable. The content of $Sb_2O_3$ is 0.1 to 2% by weight based on the total content of the glass components excluding $Sb_2O_3$.

The above glass I particularly preferably contains no $TiO_2$. When a glass containing $TiO_2$ is immersed in water, fine protrusions that are presumably caused by $TiO_2$ are formed on a substrate surface, and they cause the surface flatness and smoothness to decrease.

In the above embodiments, each glass has excellent meltability, no non-melt is found in the glass, and no crystal grains are found in the glass.

While the glass I is suitable not only for a substrate for an information recording medium which substrate has no chemically strengthened layer in the vicinity of the glass surface, but also for a substrate for an information recording medium which substrate has a chemically strengthened layer on the surface thereof, the glass I is particularly suitable for an information recording medium which substrate has no chemically strengthened layer in the vicinity of the glass surface.

The substrate having a chemically strengthened layer in the vicinity of a glass surface will be explained below. In the substrate having a chemically strengthened layer, the glass constituting the substrate preferably has a composition containing $SiO_2$, $Al_2O_3$, CaO, $Na_2O$ and $K_2O$ as essential components (to be referred to as "glass II" hereinafter). The functions of $SiO_2$, $Al_2O_3$, CaO and $K_2O$ are as already explained. $Na_2O$ and $K_2O$ are components that work to improve the glass in meltability and bring the thermal expansion coefficient of the glass into a proper range. Further, these are components necessary for the chemical strengthening. $Li_2O$ that is conventionally used for chemical strengthening is a component that greatly decreases the glass transition temperature, so that it is preferred to reduce or exclude $Li_2O$. In this case, therefore, the alkali metal ion in the glass which ion undergoes ion-exchange during the chemical strengthening is sodium ion. In the chemical strengthening, the substrate is immersed in a molten salt containing potassium ion, and sodium ion in the vicinity of the substrate surface and potassium ion in the molten salt undergo ion-exchange to form a compression stress layer in the vicinity of the substrate surface, whereby the chemical strengthening is materialized.

The substrate for an information recording medium, which substrate has a chemically strengthened layer, has high strength imparted by the chemical strengthening, so that the substrate is effective for prevention of the breaking thereof. Further, the above substrate can retain predetermined strength even when a film is formed thereon at a high temperature or when the substrate is annealed at a high temperature. Further, since the substrate has high strength, there are produced effects that the substrate does not easily break even when it is exposed to a sharp change in temperature during the above treatments at high temperatures, and that handling of such a substrate is easy.

The above substrate includes a substrate manufactured by immersing a disk-shaped glass having a central hole in an alkali metal molten salt, preferably a molten salt containing potassium (e.g., potassium nitrate molten salt), and allowing alkali metal ion in the glass (particularly, in the vicinity of the glass surface) and alkali metal ion in the molten salt to undergo ion-exchange to form a compression stress layer in the vicinity of the glass surface (chemically strengthening the glass).

In the substrate for an information recording medium which substrate has a chemically strengthened layer in the vicinity of a glass surface, the flexural strength of the glass constituting the substrate after the glass is heated at 570° C. for 2 hours is preferably 147 MPa or more, more preferably 167 MPa or more, still more preferably 196 MPa or more. For easily obtaining a highly stable glass in the above range, it is sufficient to adjust the above flexural strength to 980 MPa or less. In the above substrate, the compression stress layer formed in the vicinity of the glass surface by the chemical strengthening is free of relaxation that occurs in heat-treatment at high temperatures, so that there can be provided a substrate for an information recording medium which substrate can retain high strength after heat-treatment. The above flexural strength is determined with regard to a measurement sample that is prepared by providing a 40 mm×10 mm×1 mm thin glass sample formed of a glass for constituting the above substrate and heat-treating the sample in atmosphere at 570° C. for 2 hours. In this case, the above measurement sample is subjected to a three-point bending test at a span of 30 mm at a load velocity of 0.5 mm/second, and the thus-obtained result is taken as a value of a flexural strength. As the above measurement sample, there is used a sample having four side surfaces (two side surfaces having a size of 40 mm×1 mm each and two side surfaces having a size of 10 mm×1 mm each) polished and having two main surfaces (two surfaces having a size of 40 mm×10 mm) polished as well. The above polishing is preferably optical polishing. Further, the above two side surfaces having a size of 40 mm×1 mm each are polished to be rounded.

Further, in the substrate for an information recording medium which substrate has a chemically strengthened layer in the vicinity of the surface, the value of (fT−fb)/fb is preferably 0.5 or more, more preferably 0.52 or more, in which fb is a flexural strength value measured before the above chemical strengthening and fT is a flexural strength value measured after the above chemically strengthened glass is maintained at a temperature T[° C.] (T is any temperature of 20 to 570° C.) for 2 hours. Measurements for the above flexural strength values are also made as described above.

When the above substrate is subjected to an acceleration test under conditions wherein it is heated at any temperature of 20 to 570° C. for 2 hours, the flexural strength can be sufficiently greater than the flexural strength obtained before the chemical strengthening. According to the above conditions, there can be provided a substrate for an information recording medium which substrate is formed of a glass that has flexural strength sufficient for forming an information recording layer thereon or carrying out heat treatment, particularly formation of an information recording layer of a perpendicular-magnetic-recording-mode information recording medium or heat treatment. The above heating at a temperature T for 2 hours is carried out in atmosphere.

For imparting the glass with higher stability and making it possible to carry out better chemical strengthening, the value of (fT−fb)/fb is 9 or less. The value of (fT−fb)/fb that is a predetermined value or greater can be determined by measuring a glass for a flexural strength fb, measuring the glass for a flexural strength f570 after the glass is chemically strengthened and then maintained at 570° C. for 2 hours, calculating the value of (f570−fb)/fb, and confirming whether or not the calculated value is the above predetermined value or greater. Further, the value of (fT−fb)/fb that is a predetermined value or smaller can be determined by measuring a glass for a flexural strength fb, measuring the glass for a flexural strength f570 after the glass is chemically strengthened and then maintained at 570° C. for 2 hours, calculating the value of (f570−fb)/fb, and confirming whether or not the calculated value is the above predetermined value or smaller.

With regard to the flexural strength f20 at 20° C., the value of (f20−fb)/fb is preferably 1 or more, more preferably 1.2 or more. Further, for imparting the glass with higher stability and making it possible to carry out better chemical strengthening, the value of (f20−fb)/fb is 9 or less.

The glass composition of the glass II will be explained below.

With regard to the glass II, Na ion in a glass and K ion in a molten salt are subjected to ion-exchange, thereby to form a chemically strengthened layer in the vicinity of a glass surface. The glass II therefore contains $Na_2O$ as an essential component.

The glass II preferably has a glass composition containing the following components in the following content ranges.

The glass II has a glass composition comprising, by mol %, 47 to 70% of $SiO_2$, 1 to 10% of $Al_2O_3$, the total content of $SiO_2$ and $Al_2O_3$ being 57 to 80%, 2 to 25% of CaO, 1 to 15% of BaO, 1 to 10% of $Na_2O$, more than 0% but not more than 15% of $K_2O$, 0 to 3% of $Li_2O$, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, and 0 to 10% of $TiO_2$, the total content of said components being at least 95%. In the above glass II, the ratio of the content of CaO to the total content of MgO, CaO, SrO and BaO (CaO/(MgO+CaO+SrO+BaO)) is preferably at least 0.5, more preferably at least 0.55, still more preferably at least 0.6.

The functions of the above components and the reasons for limitations of the contents of the components to the above ranges will be explained in detail below, while the functions and reasons common to the glass. I and the glass II will be omitted. The glass I and the glass II differ in that the glass II has a glass composition suitable for chemical strengthening.

BaO contributes to an improvement in thermal expansion and has an effect on improving the glass in durability. It is therefore preferred to incorporate 1% or more of BaO. When BaO is incorporated to excess, the glass is liable to be degraded in durability. Further, when BaO is incorporated, the specific gravity of the glass increases to a great extent, so that the content of BaO is preferably in the range of 1 to 15%, more preferably 1 to 14%.

$Na_2O$ and $K_2O$ are useful components that decrease the viscosity of the glass in melting the glass and promote the melting and which increase the thermal expansion coefficient of the glass. Particularly, $Na_2O$ is used for ion-exchange, and sodium ion in the glass is replaced with potassium ion in a molten salt by the ion-exchange to strengthen the glass. However, the total content of $Na_2O$ and $K_2O$ exceeds 16%, not only the glass is degraded in chemical durability, but also an alkali in a larger amount comes to precipitate on a glass surface and may hence corrode an information recording layer such as a magnetic layer. Further, the glass transition temperature decreases and no required heat resistance can be possibly attained. When the total content of the above components is less than 3%, it is difficult to carry out excellent chemical strengthening, the meltability of the glass decreases, or it is difficult to attain the predetermined thermal expansion properties. Therefore, the total content of $Na_2O$ and $K_2O$ is preferably 3 to 16%, more preferably 4 to 12%.

$Na_2O$ is an essential component for enabling the chemical strengthening without decreasing the glass transition temperature. For carrying out excellent chemical strengthening, it is preferred to incorporate at least 1% of $Na_2O$. Further, while $Na_2O$ has a great effect on increasing the thermal expansion coefficient of the glass, the effect is not so great as that of $K_2O$. Further, $Na_2O$ precipitates on a glass surface to a greater extent. Therefore, the content of $Na_2O$ is preferably 1 to 10%, more preferably 1 to 9%, still more preferably 1 to 8%, further more preferably 1 to 7%, particularly preferably 1 to 5%.

$Li_2O$ has a great effect on increasing the thermal expansion coefficient and the Young's modulus of the glass. However, it precipitates on a glass surface to a great extent, and it works to decrease the glass transition temperature even when incorporated in a small amount. It is therefore preferred to control the content of $Li_2O$ so that it is 3% or less. More preferably, the content of $Li_2O$ is 1% or more, and still more preferably, no $Li_2O$ is incorporated.

Meanwhile, for preventing the decrease of the glass transition temperature, it is required to control the alkali metal oxide content so that it is a predetermined content or less. When the alkali metal oxide content is decreased, the meltability of the glass decreases, and the thermal expansion coefficient of the glass comes to be lower than a thermal expansion coefficient range suitable for a substrate for an information recording medium. For preventing the above decrease in the meltability and the above decrease in the thermal expansion coefficient, alkaline earth metal oxides are incorporated. CaO among alkali earth metal oxides is classified into oxides having relatively small molecular weights, and CaO does not much increase the specific gravity of the glass. MgO also has an effect on preventing an increase in the specific gravity. As compared with CaO, however, MgO tends to decrease the efficiency of the chemical strengthening. Therefore, a larger content of CaO is utilized among alkaline earth metal oxides. Quantitatively, the contents of the above components can be determined so that the ratio of CaO/(MgO+CaO+SrO+BaO) is preferably at least 0.5, more preferably at least 0.55, still more preferably at least 0.6. Further, the alkaline earth metal oxides improve the glass in meltability without decreasing the glass transition temperature and increase the thermal expansion coefficient of the glass as described above. Therefore, the total content of MgO, CaO, SrO and BaO is preferably 10 to 30%, more preferably 12 to 30%, still more preferably 12 to 25%.

Further, BaO among the alkaline earth metal oxides increases the devitrification resistance of the glass and works greatly to increase the thermal expansion coefficient of the glass as compared with MgO, CaO and SrO. Desirably, BaO is therefore incorporated such that the ratio of BaO/(MgO+CaO+SrO+BaO) is preferably at least 0.15, more preferably at least 0.16, still more preferably at least 0.17.

A second substrate formed of a glass having a chemically strengthened layer in the vicinity of a glass surface will be explained below. The glass constituting the substrate preferably contains $SiO_2$, $Al_2O_3$, CaO, BaO, $Na_2O$ and $ZrO_2$ as essential components (to be referred to as "glass III" hereinafter).

The functions of $SiO_2$, $Al_2O_3$, CaO and $Na_2O$ and the functions of the other components are as described already.

The glass III preferably has a glass composition comprising, by mol %, 47 to 70% of $SiO_2$, 1 to 10% of $Al_2O_3$, the total content of $SiO_2$ and $Al_2O_3$ being 57 to 80%, 2 to 25% of CaO, 1 to 15% of BaO, 1 to 10% of $Na_2O$, 0 to 15% of $K_2O$, 0 to 3% of $Li_2O$, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, the ratio of the content of CaO to the total content of MgO, CaO, SrO and BaO being 0.5 or more, and 0 to 10% of $TiO_2$, the total content of said components being at least 95%. The preferable composition of the glass III differs from that of the glass II in that the content of $K_2O$ is 0 to 15% in the former while it is more than 0% but not more than 15% in the latter. Reasons why the above composition is preferred are the same as those explained in the glass II, and the ranges of the contents of the above components are also the same as those in the glass II.

Other components than mentioned above and contents of the other components are properly determined by taking account of various properties such as the contents of the above components, attainment of high glass transition temperature, suitability to chemical strengthening, a decrease in relaxation of a chemically strengthened layer, and the like.

In addition to the above components, the above glasses (glass II and glass III) to be chemically strengthened may contain $As_2O_3$, $Sb_2O_3$, a fluoride, a chloride and $SO_3$ for improving each glass in meltability, clarity and moldability. While the total content of these can be within a range suitable for use as a defoaming agent, it is preferably 2% by weight or less based on the total content of the glass components excluding these. It is more preferred to select $Sb_2O_3$ among these. Further, when an adverse effect on environments is taken into account, desirably, an arsenic compound such as $As_2O_3$ is not incorporated. It is more preferred to incorporate 0 to 2% by weight of $Sb_2O_3$ alone as a defoaming agent. The reason why it is preferred to incorporate $Sb_2O_3$ is as discussed above. The content of $Sb_2O_3$ based on the total content of the glass components excluding $Sb_2O_3$ is more preferably 0.1 to 2% by weight, still more preferably 0.1 to 1% by weight.

A glass having a more preferred composition can be selected by combining the above glass components in more preferred amount ranges out of the above preferred amount ranges. Above all, a more preferred glass has a composition comprising, by mol %, 47 to 70% of $SiO_2$, 1 to 10% of $Al_2O_3$, the total content of $SiO_2$ and $Al_2O_3$ being 57 to 80%, 2 to 25% of CaO, 1 to 15% of BaO, 1 to 10% of $Na_2O$, more than 0% but not more than 15% of $K_2O$, the total content of $Na_2O$ and $K_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, and 0 to 10% of $TiO_2$, the total content of said components being at least 95%. The composition of the above glass still more preferably has an $Na_2O$ content of 1 to 9%, further more preferably has a $ZrO_2$ content of 1 to 10%.

The composition of the above glass particularly preferably contains 50 to 67% of $SiO_2$, 2 to 10% of $Al_2O_3$, the total content of $SiO_2$ and $Al_2O_3$ being 57 to 79%, 3 to 20% of CaO, 1 to 14% of BaO, 0 to 10% of MgO, 0 to 10% of SrO, 0 to 8% of ZnO, the total content of MgO, CaO, SrO, BaO and ZnO being 3 to 30%, 1 to 10% of $Na_2O$, more than 0% but not more than 13% of $K_2O$, the total content of $Na_2O$ and $K_2O$ being 4 to 12%, 1 to 10% of $ZrO_2$ and 0 to 8% of $TiO_2$. The composition of the above glass still more preferably has a $ZrO_2$ content of 1 to 3%, In the above composition, still more preferably, the total content of MgO, CaO, SrO, BaO and ZnO is 3 to 25%.

In an embodiment containing no rare earth metal element, preferably, the total content of $SiO_2$, $Al_2O_3$, CaO, BaO, MgO, SrO, ZnO, $Li_2O$, $Na_2O$, $K_2O$ and $ZrO_2$ is 100%. Further, the above composition may contain the above defoaming agent. Desirably, the alkali metal oxide is limited to $Na_2O$ and $K_2O$ for attaining excellent meltability and heat resistance while suppressing an alkali elution amount. In the above composition, more preferably, the total content of $SiO_2$, $Al_2O_3$, CaO, BaO, $Na_2O$, $K_2O$ and $ZrO_2$ is 100%. The above defoaming agent may be added in any one of the above glass compositions. As a defoaming agent, $Sb_2O_3$ is particularly preferred. The content of $Sb_2O_3$ based on the total content of the above components excluding $Sb_2O_3$ is more preferably in the range of 0 to 2%, still more preferably 0.1 to 2%, particularly preferably 0.1 to 1% by weight.

In an embodiment containing a rare earth metal, preferably, the total content of $SiO_2$, $Al_2O_3$, CaO, BaO, MgO, SrO, ZnO, $Li_2O$, $Na_2O$, $K_2O$, $ZrO_2$, $TiO_2$, $B_2O_3$ and a rare earth metal oxide is 100%. Above all, it is preferred to control the rare earth metal oxide such that the content thereof is 5% or less.

In the glasses II and III, preferably, the glass composition therefor contains no $TiO_2$ for preventing the occurrence of fine protrusions caused when the substrate is immersed in water. Further, the glasses II and III are excellent in meltability, and neither non-melted substance nor fine crystal grains are found in the glass.

In addition to the above high heat resistance and high acid resistance, the glass substrate of the present invention preferably also has thermal expansion properties preferred for a substrate for an information recording medium, that is, an average thermal expansion coefficient ($\alpha$), measured at temperatures from 100 to 300° C., of $70 \times 10^{-7}/°$ C. or more, more preferably a thermal expansion coefficient of $80 \times 10^{-7}/°$ C. or more. The upper limit of the above average thermal expansion coefficient ($\alpha$) is, generally, approximately $120 \times 10^{-7}/°$ C.

In the glass substrate of the present invention, the specific gravity is preferably 3.5 or less. The glass substrate having a specific gravity of 3.5 or less can reduce the torque in the rotation of an information recording medium. The specific gravity is more preferably 3.2 or less. Further, for attaining high stability of an information recording medium in rotation, the substrate preferably has high rigidity, that is, preferably has a Young's modulus of 72 GPa or more.

The substrate formed of each of the glasses I, II and III contains an alkali metal oxide for imparting each glass with excellent meltability. In these substrates, however, the alkali elution amount is remarkably small. The above alkali elution amount is represented by an elution amount per unit area when the substrate is immersed in water maintained at 80° C. for 24 hours. In the substrate of the present invention, generally, the value thereof is 0.2 µmol/cm$^2$ or less (0.2×10$^{-6}$ mol/cm$^2$ or less). Due to the above properties combined, the substrate for an information recording medium, provided by the present invention, is suitable for higher-density recording. When the above alkali elution amount is larger than 0.2 µmol/cm$^2$, an alkali metal in the glass is eluted during the step of cleaning of the substrate and roughens the substrate surface, and the flatness and smoothness of the substrate surface finished by polishing and lapping may be impaired. Further, after an information recording layer is formed, there is also caused a problem that an alkali metal eluted from the substrate may corrode the information recording layer. The alkali elution amount is preferably 0.1 µmol/cm$^2$ or less, more preferably, 0.05 µmol/cm$^2$.

The above alkali elution amount refers to a value determined by the following measurement method.

(Method of Measuring Alkali Metal Ion Elution Amount (Alkali Elution Amount))

A glass sample having clean surfaces is placed in a hermetically closable container, and the container with the glass sample in it is weighed. This mass is taken as a mass A. Then, approximately 20 ml of ultrapure water having a temperature of 70 to 75° C. is placed in the container such that the glass sample is completely immersed in the water, and the hermetically closed container is allowed to stand in a state the temperature inside the container is maintained at 80° C., for 24 hours. Then, the hermetically closed container is weighed, and this mass is taken as a mass B. Then, the glass sample is taken out. The water in which the glass sample has been immersed has a mass obtained by deducting the mass A from the mass B. Then, the water in which the glass sample has been immersed is measured for a concentration of an alkali metal element eluted in the water with ICP-AES (ICP emission spectroscopy apparatus "VISTA AX", supplied by Barian). The amount of the eluted alkali metal element is calculated on the basis of the concentration of the alkali metal element and the mass of the water, and the obtained value is divided by the surface area of the glass sample, to determine the alkali elution amount. In the measurement, it is required to be fully careful about factors that decrease measurement accuracy, such as the purity of water in which the glass sample is to be immersed, the cleanness of the container, the elution into the water from the container, and the like. When the glass sample contains a plurality of alkali metal elements, amounts (represented by mol) of alkali ions contained in water in which the glass sample is immersed are measured and calculated on the basis of concentrations of the alkali metal ions, and the total amount thereof is divided by the surface area of the glass sample, to determine an elution amount of the alkali metal ions.

The process for manufacturing an information recording medium will be explained below. The process can be selected from known processes as required. For example, glass materials having predetermined amount ratios are melted in air or in an inert gas atmosphere by a high-temperature melting method, and the resultant glass is homogenized by bubbling, stirring or the like and shaped into a sheet glass by a known pressing method, down drawing method or floating method, followed by processing of the glass to a circular form, making a hole in the center, processing of inner and outer circumferential surfaces, polishing and lapping, whereby there is formed a substrate for an information recording medium which substrate has a desired size and a desired form. In the polishing and lapping, the lapping is carried out with a polishing material or diamond pellets, and the polishing is carried out with a polishing material such as cerium oxide, to flatten and smoothen the substrate surface so that a surface accuracy in the range of 0.1 to 0.6 nm can be attained. After the above steps, the substrate surface is cleaned using an acid as a wash liquid, to remove soiling substances such as polisher grains adhering to the surface, fine glass dust removed by the polishing, and the like. In this case, the flatness and smoothness of the substrate are not at all impaired by the cleaning with an acid since the glass has excellent acid resistance.

As a wash liquid for the cleaning with an acid, it is preferred to use a hydrosilicofluoric acid aqueous solution. The temperature and concentration of the hydrosilicofluoric acid aqueous solution can be determined by taking account of the state of the substrate surface. With regard to the concentration of the above solution, the concentration of a solution prepared by approximately 10 times diluting the hydrosilicofluoric acid aqueous solution used for the evaluation of the above acid resistance can be used as a standard. Further, cleaning with an alkali solution or an organic solvent may be employed in combination with the above cleaning with an acid.

In view of the flatness, smoothness and cleanness of the surface of the substrate of the present invention which has an alkali elution amount at a remarkably low level and is hence preferred as such, the cleaning can be more excellently carried out. Further, when the cleaned substrate is exposed to atmosphere, the substrate is free from surface roughening caused by the alkali elution. When the substrate of the present invention is used, for example, as a substrate for an information recording medium, there can be provided a perpendicular-magnetic-recording-mode magnetic recording medium. And, it comes to be possible to provide a magnetic recording medium having a higher recording density (e.g., 1 TBits/(2.5 cm)$^2$) than the surface recording density 100 GBits/(2.5 cm)$^2$ of a conventional longitudinal-magnetic-recording-mode magnetic recording medium.

The present invention includes an embodiment in which a substrate is immersed into a molten salt containing one or more alkali ions to chemically strengthen the substrate by ion-exchange reaction. By this chemical strengthening, a compression stress layer is formed as a chemically strengthened layer on the surface of the substrate. As the molten salt, there are used those containing an alkali metal ion having a larger ionic radius than the alkali metal ion existing in the glass. Examples of the molten salt are a molten potassium nitrate salt and a mixed molten salt containing potassium nitrate and sodium nitrate.

When a glass constituting the substrate contains Na$_2$O and does not contain Li$_2$O, chemical strengthening is preferably performed with a molten salt containing potassium ion. When the glass contain Na$_2$O and Li$_2$O, a molten salt containing potassium and sodium ions is preferably used in chemical strengthening.

The information recording medium of the present invention and the method of manufacturing the same will be explained below.

The information recording medium of the present invention comprises the above substrate for an information recording medium and an information recording layer formed thereon. When the information recording medium such as a magnetic disk is manufactured using the above glass substrate, an undercoat layer, a magnetic layer, a protective layer, a lubricant layer, and the like are consecutively formed on the glass substrate. Although not specially limited, the magnetic layer (information recording layer) is preferably, for example, a magnetic layer formed of a Co—Cr system, a Co—Cr—Pt system, a Co—Ni—Cr system, a Co—Ni—Pt system, a Co—Ni—Cr—Pt system or a Co—Cr—Ta system. The undercoat layer includes an Ni layer, an Ni—P layer and a Cr layer. The term "system" used herein means a material containing metals expressly stated.

The material suitable for higher-density recording particularly includes an alloy material of a Co—Cr—Pt system, and particularly preferably includes an alloy material of a Co—Cr—Pt—B system. Further, an alloy material of an Fe—Pt system is also preferred. When used as a magnetic material for the perpendicular magnetic recording mode, the above magnetic layers have high utility. A magnetic layer of the alloy material of a Co—Cr—Pt system is formed at 300 to 500° C., a magnetic layer of the alloy material of an Fe—Pt system is formed at a high temperature of 500 to 600° C., or these magnetic layers formed are heat-treated at such temperatures, to adjust crystal alignments or crystal structures, whereby constitutions suitable for higher-density recording can be obtained.

As an undercoat layer, a non-magnetic undercoat layer and/or a soft magnetic layer can be used. The non-magnetic undercoat layer is formed mainly for attaining finer crystal grains of the magnetic layer or controlling the crystal alignment of the magnetic layer. A bcc-system crystalline undercoat layer, for example, a Cr-based undercoat layer has the action to promote in-plane alignment and is therefore preferred for an in-plane (longitudinal)-recording-mode magnetic disk. An hcp-system crystalline undercoat layer, for example, a Ti-based undercoat layer or an Ru-based undercoat layer has the action to promote perpendicular alignment and can be therefore used for a perpendicular-magnetic-recording-mode magnetic disk. Further, an amorphous undercoat layer has the action to attain finer crystal grains of the magnetic layer.

The soft magnetic undercoat layer is mainly used for a perpendicular-magnetic-recording-mode disk and has the action to promote the recording of a magnetization pattern in a perpendicular magnetic recording layer (magnetic layer) with a magnetic head. The soft magnetic undercoat layer is required to be a layer having a large saturated magnetic flux density and having high magnetic permeability for fully exhibiting its function. Preferably, therefore, the soft magnetic undercoat layer is formed at a high temperature, or the formed soft magnetic undercoat layer is heat-treated. Examples of the material for the above soft magnetic layer include Fe-based soft magnetic materials such as an Fe—Ta—system soft magnetic material, a Fe—Ta—C-system soft magnetic material. A Co—Zr—system soft magnetic material and a Co—Ta—Zr-system soft magnetic material are preferred as well.

As a protective layer, a carbon film, or the like can be used. For forming the lubricant layer, a perfluoropolyether-based lubricant, or the like can be used.

In a preferred embodiment of the perpendicular-magnetic-recording-mode disk, a soft magnetic undercoat layer, an amorphous non-magnetic undercoat layer, a crystalline non-magnetic undercoat layer, a perpendicular magnetic recording layer (magnetic layer), a protective layer and a lubricant layer are formed on the glass substrate of the present invention in this order.

The substrate for an information recording medium, provided by the present invention, is particularly suitable for a perpendicular-magnetic-recording-mode magnetic recording medium. The film constitution of the perpendicular-magnetic-recording-mode magnetic recording medium preferably includes, for example, a single-layered film in which a perpendicular magnetic recording layer is formed on a non-magnetic substrate, a two-layered film in which a soft magnetic layer and a magnetic recording layer are consecutively stacked and a three-layered film in which a hard magnetic layer, a soft magnetic layer and a magnetic recording layer are consecutively stacked. Of these, the two-layered film and the three-layered film are preferred since they are suitable for attaining higher-density recording and maintaining stability of a magnetic moment.

For improving the above multi-layered-magnetic-film perpendicular magnetic recording medium in properties, it is required to expose the substrate to a high temperature of 300 to 600° C., preferably 400 to 600° C., by forming the film with a high-temperature sputtering machine or heat-treating (annealing) the formed film at a temperature of 300 to 600° C., preferably 400 to 600° C. Since the substrate for an information recording medium, provided by the present invention, is formed of the glass having a glass transition temperature of 600° C. or higher, preferably 620° C. or higher, the substrate can maintain excellent flatness without being deformed under the above high-temperature heat-treatment. There can be therefore obtained an information recording medium such as a magnetic disk having the above film formed on the flat substrate. The above high-temperature heat-treatment is carried out after the chemical strengthening of the substrate. In the information recording medium of the present invention, the compression stress layer in the vicinity of the substrate surface has little relaxation after the heat-treatment, so that there can be obtained an information recording medium such as a magnetic disk having fully high mechanical strength. While the dimensions of the substrate for an information recording medium (e.g., a magnetic disk substrate) and the information recording medium (e.g., a magnetic disk), provided by the present invention, are not critical, the medium and the substrate can be decreased in size since higher-density recording can be accomplished. Therefore, the above substrate or medium of the present invention is naturally suitable not only for a magnetic disk substrate or magnetic disk having a nominal diameter of 2.5 inches but also for a magnetic disk substrate or magnetic disk having a small diameter (e.g., 1 inch).

EXAMPLES

The present invention will be explained further in detail with reference to Examples, while the present invention shall not be limited by these Examples.

Examples 1-4

$SiO_2$, $Al_2O_3$, $Al(OH)_3$, MgO, $CaCO_3$, $BaCO_3$, $Na_2CO_3$, $K_2CO_3$, $TiO_2$, $ZrO_2$ and the like as starting materials were weighed in an amount of 300 to 1500 g so as to obtain a glass composition shown in Table 1 and fully mixed to prepare a formulated batch. The batch was placed in a platinum crucible and melted at a temperature of 1,400 to 1,600° C. in air for approximately 3 to 8 hours. After the melting, the resultant glass melt was cast into a 40×40×20 mm carbon mold, allowed to cool to a glass transition temperature, placed in an annealing furnace immediately thereafter and maintained for 1 hour, and then the glass in the annealing furnace was allowed to cool to room temperature. In the thus-obtained glass in each Example, there was precipitated no crystal that was observable through a microscope. Further, the obtained glasses had high homogeneity and had no non-melted substance observable, and it was shown that the glasses had high meltability.

Each of the above-obtained glasses was processed into samples having a size of 40×20×15 mm, 5φ×20 mm, 30×30×2 mm or 40 mm×10 mm×1 mm, to obtain samples for evaluation of various physical properties. The glass samples were measured for physical properties according to the following methods. Table 1 shows the results. Further, $Sb_2O_3$ in an amount of 0.5% by weight based on each of the glass compositions in Examples 1 to 4 excluding $Sb_2O_3$ was also added to each of the glass compositions, and glass samples were prepared and measured for physical properties in the same manner as above. These glass samples also showed results similar to those shown in Table 1. When the glasses containing $Sb_2O_3$ were observed through a microscope, no bubbles were observed.

(1) Glass Transition Temperature (Tg)

A 5φ×20 mm sample was measured with a thermo-mechanical analyzer (TMA8140) supplied by Rigaku K.K. at a temperature elevation rate of +4° C./minute. $SiO_2$ was used as a standard sample.

(2) Etching Rate to Hydrosilicofluoric Acid Aqueous Solution

A hydrosilicofluoric acid aqueous solution having a concentration of 1.72% by weight was prepared, and the aqueous solution was maintained at a temperature of 45° C. A polished glass was immersed in the aqueous solution in a 28 KHz ultrasonic wave bath, to determine an etching rate on the polished surface.

(3) Average Linear Thermal Expansion Coefficient

The average linear thermal expansion coefficient means average linear thermal expansion coefficients at 30 to 300° C. and at 100 to 300° C., and the measurements were made together with the measurement of the glass transition temperature.

(3) Young's Modulus, Rigidity and Poisson Ratio

A 40×20×15 mm sample was measured according to an ultrasonic wave method.

(3) Specific Gravity

A 40×20×15 mm sample was measured according to an Archimedean method.

(5) Liquidus Temperature

A 40×20×15 mm sample was allowed to stand in a furnace at 1,050° C. for 15 hours, and then the sample was observed for crystal grains. When no crystal grains were observed, it was determined that such a glass had a liquidus temperature of 1,050° C. or lower.

(6) Flexural Strength

A 40 mm×10 mm×1 mm thin sheet sample was subjected to a three-point bending tester at a 30 mm span load-application rate of 0.5 mm/second. The sample had a polished surface. The two 40 mm×1 mm major side surfaces were polished to have a rounded form.

(7) Alkali Elution Amount

A 30×30×2 mm sample ultrasonically washed in an ethanol bath was placed in a polypropylene container that had been washed with an acid beforehand, and the sample was measured according to the method described in the present specification.

Examples 1 to 3 are concerned with chemically strengthened glasses, and Example 4 is concerned with a glass having no chemically strengthened layer.

The chemically strengthened glasses in Examples 1 to 3 were prepared as follows. The surface of a glass having the above form was cleaned, and the glass was immersed in a potassium nitrate molten salt at 420° C. for 4 hours and washed with water.

TABLE 1

| | | Ex. 1 | Ex. 2 | Ex. 3 | Ex. 4 |
|---|---|---|---|---|---|
| Glass composition (mol %) | $SiO_2$ | 65.0 | 65.0 | 63.0 | 63.0 |
| | $Al_2O_3$ | 5.0 | 5.0 | 4.0 | 3.0 |
| | $(SiO_2 + Al_2O_3)$ | (70.0) | (70.0) | (67.0) | (66.0) |
| | MgO | 0.0 | 0.0 | 0.0 | 0.0 |
| | CaO | 13.0 | 13.0 | 13.0 | 14.0 |
| | SrO | 0.0 | 0.0 | 0.0 | 0.0 |
| | BaO | 3.0 | 3.0 | 3.0 | 3.0 |
| | ZnO | 0.0 | 0.0 | 0.0 | 0.0 |
| | (MgO + CaO + SrO + BaO + ZnO) | (16.0) | (16.0) | (16.0) | (17.0) |
| | $Na_2O$ | 4.0 | 5.0 | 4.0 | 0.0 |
| | $K_2O$ | 6.0 | 5.0 | 5.0 | 9.0 |
| | $Li_2O$ | 0.0 | 0.0 | 0.0 | 0.0 |
| | $(Li_2O + Na_2O + K_2O)$ | (10.0) | (10.0) | (9.0) | (9.0) |
| | $ZrO_2$ | 4.0 | 4.0 | 4.0 | 4.0 |
| | $TiO_2$ | 0.0 | 0.0 | 4.0 | 4.0 |
| Physical Properties | Total | 100.0 | 100.0 | 100.0 | 100.0 |
| | Glass transition temperature (° C.) | 665 | 658 | 669 | 702 |
| | Etching rate (μm/min.) | 0.035 | 0.031 | 0.030 | 0.031 |
| | Average linear thermal expansion coefficient 1 ($\times 10^{-7}$/K) | 79.7 | 79.2 | 79.5 | 81.1 |

TABLE 1-continued

|  | Ex. 1 | Ex. 2 | Ex. 3 | Ex. 4 |
|---|---|---|---|---|
| Average linear thermal expansion coefficient 2 ($\times 10^{-7}$/K) | 83.0 | 83.1 | 83.3 | 84.1 |
| Young's modulus (GPa) | 80.0 | 80.9 | 82.7 | 78.2 |
| Rigidity (GPa) | 32.4 | 32.7 | 33.4 | 31.5 |
| Specific gravity | 2.74 | 2.74 | 2.79 | 2.78 |
| Specific elastic modulus | 29.2 | 29.5 | 29.6 | 28.1 |
| Poisson ratio | 0.24 | 0.24 | 0.24 | 0.24 |
| Liquidus temperature (° C.) | 1050 or less | 1050 or less | 1050 or less | 1050 or less |
| Flexural strength 1 (MPa) | 127 | 127 | 118 | 127 |
| Flexural strength 2 (MPa) | 294 | 294 | 363 | — |
| Flexural strength 3 (MPa) | 206 | 206 | 245 | — |
| Ion-exchange temperature (° C.) | 420 | 420 | 420 | — |
| Ion-exchange time period (hour) | 3 | 3 | 3 | — |
| Alkali elution amount (μmol/cm$^2$) | 0.011 | 0.016 | 0.014 | 0.015 |

(Note 1)
Average linear thermal expansion coefficient 1 represents an average linear thermal expansion coefficient in temperatures from 30° C. to 300° C., and Average linear thermal expansion coefficient 2 represents an average linear thermal expansion coefficient in temperatures from 100° C. to 300° C.
(Note 2)
Flexural strength 1 represents a flexural strength value of a sample that was not chemically strengthened,
Flexural strength 2 represents a flexural strength value of a sample that was chemically strengthened, and
Flexural strength 1 represents a flexural strength value of a chemically strengthened sample that was heated at 570° C. for 2 hours.

As shown in Table 1, the glasses in Examples 1 to 4 had a high glass transition temperature of at least 620° C., and they showed an etching rate of 0.1 m/minute to a hydrosilicofluoric acid aqueous solution having the specified concentration and the specified temperature or showed excellent acid resistance.

Further, the above glasses had an average linear thermal expansion coefficient of at least $70 \times 10^{-7}$/° C. in temperatures from 100 to 300° C., and they showed an alkali elution amount of 0.2 μmol/cm$^2$ or less. Further, they had a Young's modulus of at least 72 GPa or showed high rigidity.

After the above measurement of the glasses in Examples 1 to 4 for the properties, homogenized glass melts that could give the glasses of Examples 1 to 4 were fed to press molds and press-shaped in the form of a disk. Besides the press-shaping, a so-called float molding method may be employed to form a glass disk. However, it is not appropriate to employ the float molding method for a glass containing $Sb_2O_3$, since antimony and a molten metal may react with each other. The thus-shaped glass disks were gradually cooled, and the surfaces thereof were lapped, followed by making a hole in the center and working on outer circumferences and end surfaces. Further, the main surface of each was lapped and then polished to complete a flat and smooth surface. The thus-obtained substrates for an information recording medium were cleaned with using a hydrosilicofluoric acid aqueous solution as a wash liquid. Since the glasses constituting the substrates were remarkably excellent in acid resistance, excellent cleaning was carried out while suppressing the surface roughening of the substrates in the cleaning. The main surfaces of the glass substrates after the cleaning had a center-line average roughness Ra of 0.1 to 0.6 nm.

The glass substrate in Examples 1 to 3 were chemically strengthened by immersing them in a molten salt containing potassium nitrate, to give substrates having a chemically strengthened layer each. The above substrates were measured for an etching rate before and after the chemical strengthening to show that the absolute value of (a difference between the etching rate before the chemical strengthening and the etching rate after the chemical strengthening)/(the etching rate before the chemical strengthening) was 0.05 or less.

The cleaning with an acid such as a hydrosilicofluoric acid may be carried out before the chemical strengthening of the substrate, may be carried out after the chemical strengthening of the substrate, or may be carried out before and after the chemical strengthening of the substrate. For a substrate formed of a glass in which the absolute value of (a difference between the etching rate before the chemical strengthening and the etching rate after the chemical strengthening)/(the etching rate before the chemical strengthening) is small, the excellent cleaning with an acid can be carried out regardless of whether the cleaning is carried out before the chemical strengthening or it is carried out after the chemical strengthening. Further, a substrate having no chemically strengthened layer was obtained from the glass in Example 4. Further, similar substrates were obtained from glasses containing $Sb_2O_3$.

The glass substrates were measured for center-line average roughness Ra with an atomic force microscope (AFM).

Then, perpendicular-magnetic-recording-mode magnetic disks were manufactured from the cleaned and dried glass substrates.

With regard to the formation of a magnetic recording layer, two types of perpendicular-magnetic-recording-mode magnetic disks were manufactured. That is, one was a two-layered film in which a soft magnetic layer and a magnetic recording layer were consecutively stacked, and the other was a three-layered film in which a hard magnetic layer, a soft magnetic layer and a magnetic recording layer were consecutively stacked. In the above step, the magnetic recording films were heat-treated at a high temperature of 400 to 600° C. Since, however, the substrates had a glass transition temperature (Tg) of 620° C. or higher or had high heat resistance, the substrates retains high flatness without being deformed. In the above manner, those magnetic disks that have been explained already can be manufactured.

The glass substrate of the present invention has a high glass transition temperature, so that it is suitable for high-temperature treatment for improving a magnetic recording medium in properties and for forming a magnetic film with a high-temperature sputtering apparatus. Further, although the glass substrates containing an alkali metal were used, no adverse effect caused by the alkali precipitation from the substrate was found after the formation of the information recording layers.

According to the present invention, there can be provided a substrate having high heat resistance and high acid resistance, and the substrate can give a structure in which an information recording layer is formed on a clean, flat and smooth substrate surface and can give an information recording medium having both a high recording density and high reliability.

While the above Examples have explained magnetic recording media as an example, excellent results can be similarly obtained with regard to a substrate for other information recording medium and other information recording medium such as a substrate for optical recording and a substrate for magneto-optical recording or an optical recording medium and a magneto-optical recording medium.

INDUSTRIAL APPLICABILITY

In the substrate for an information recording medium, provided by the present invention, the etching rate to a hydrosilicofluoric acid aqueous solution having a specified temperature and a specified concentration is remarkably low, or as low as 0.1 μl/minute or less, a clean substrate surface can be attained while suppressing the deformation of the substrate during high-temperature treatment in the manufacture of an information recording medium and while the flatness and smoothness of the substrate is maintained. Further, since the glass transition temperature (Tg) of the substrate is 600° C. or higher, preferably 620° C. or higher, there can be provided an information recording medium having a higher recording density while suppressing the deformation of the substrate during high-temperature treatment in the manufacture of an information recording medium.

Further, the substrate for an information recording medium, provided by the present invention, is particularly suitable for a perpendicular-magnetic-recording-mode magnetic recording medium.

The substrate for an information recording medium, provided by the present invention, has high heat resistance and high acid resistance, and gives an information recording medium having a high recording density and high reliability when an information recording layer is formed thereon.

What is claimed is:

1. A substrate for an information recording medium, which is formed of a glass containing, by mol %:
   45 to 70% of $SiO_2$, 1 to 15% of $Al_2O_3$, total content of $SiO_2$ and $Al_2O_3$ being 57 to 85%;
   2 to 25% of CaO, more than 0 but not more than 15% of BaO, 0 to 15% of MgO, 0 to 15% of SrO, 0 to 10% of ZnO, total content of MgO, CaO, SrO, BaO and ZnO being 2 to 30%;
   more than 0% but not more than 15% of $K_2O$, more than 0 but not more than 8% of $Na_2O$, total content of $K_2O$ and $Na_2O$ being 2 to 15%;
   more than 0 but not more than 12% of $ZrO_2$, 0 to 10% of $TiO_2$, ratio of content of CaO to the total content of MgO, CaO, SrO and BaO (CaO/(MgO+CaO+SrO+BaO)) is 0.5% or more,
   the total content of $SiO_2$, $Al_2O_3$, MgO, CaO, SrO, BaO, ZnO, $K_2O$, $Na_2O$, $ZrO_2$, $TiO_2$ components in the glass being at least 95 mol%, the glass contains no $Li_2O$, and has a glass transition temperature (Tg) of 600° C. or higher and an etching rate of 0.1 μl/minute or less with regard to a hydrosilicofluoric acid aqueous solution maintained at a temperature of 45° C. with the hydrosilicofluoric acid concentration 1.72% by weight.

2. The substrate for an information recording medium as recited in claim 1, wherein the glass contains $SiO_2$, $Al_2O_3$, CaO, $Na_2O$ and $K_2O$ and has a chemically strengthened layer.

3. The substrate for an information recording medium as recited in claim 2, wherein the glass has a composition comprising, by mol %, 47 to 70% of $SiO_2$, 1 to 10% of $Al_2O_3$, the total content of $SiO_2$ and $Al_2O_3$ being 57 to 80%, 1 to 15% of BaO, 1 to 10% of $Na_2O$, more than 0% but not, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, the ratio of the content of CaO to the total content of MgO, CaO, SrO and BaO being at least 0.5, and 0 to 10% of $TiO_2$, the total content of said components being at least 95 mol %.

4. The substrate for an information recording medium as recited in claim 1, wherein the glass contains $SiO_2$, $Al_2O_3$, CaO, BaO, $Na_2O$ and $ZrO_2$ as essential components and has a chemically strengthened layer.

5. The substrate for an information recording medium as recited in claim 4, wherein the glass has a composition comprising, by mol %, 47 to 70% of $SiO_2$, 1 to 10% of $Al_2O_3$, the total content of $SiO_2$ and $Al_2O_3$ being 57 to 80%, 2 to 25 % of CaO, 1 to 15% of BaO, 1 to 10% of $Na_2O$, more than 0 but not more than 15% of $K_2O$, 0 to 3% of $Li_{b\,2}O$, the total content of $Na_2O$, $K_2O$ and $Li_2O$ being 3 to 16%, 1 to 12% of $ZrO_2$, 0 to 10% of MgO, 0 to 15% of SrO, 0 to 10% of ZnO, the total content of MgO, CaO, SrO, BaO and ZnO being 3 to 30%, the ratio of the content of CaO to the total content of MgO, CaO, SrO and BaO being at least 0.5, and 0 to 10% of $TiO_2$, the total content of said components being at least 95 mol %.

6. The substrate for an information recording medium as recited in claim 1, which is for use in a perpendicular-magnetic-recording-mode information recording medium.

7. An information recording medium having an information recording layer formed on the substrate for an information recording medium recited in claim 1.

8. The information recording medium as recited in claim 7, which is a perpendicular-magnetic-recording-mode magnetic recording medium.

9. A process for manufacturing an information recording medium, which comprises the step of forming an information recording layer on a substrate for an information recording medium and uses the substrate for an information recording medium recited in claim 1 as said substrate, said step comprising the procedure of heating said substrate to a temperature of 300 to 600° C.

10. An information recording medium having an information recording layer formed on the substrate for an information recording medium recited in claim 2.

11. An information recording medium having an information recording layer formed on the substrate for an information recording medium recited in claim 3.

12. An information recording medium having an information recording layer formed on the substrate for an information recording medium recited in claim 4.

13. An information recording medium having an information recording layer formed on the substrate for an information recording medium recited in claim 5.

14. The substrate for an information recording medium as recited in claim 1, wherein the glass has a composition com prising, by mol %, 50 to 67% of $SiO_2$, 2 to 12% of $Al_2O_3$, the total content of $SiO_2$ and $Al_2O_3$ being 57 to 79%, 3 to 20% of CaO, more than 0 but not more than 14% of BaO, 0 to 10% of MgO, 0 to 10% of SrO, 0 to 8% of ZnO, the total content of MgO, CaO, SrO, BaO and ZnO being 3 to 30%, more than 0 but not more than 5% of $Na_2O$, 0.5% to 15% of $K_2O$, the total content of $K_2O$ and $Na_2O$ being 4 to 12%, more than 0 but not more than 10% of $ZrO_2$ and 0 to 8% of $TiO_2$.

\* \* \* \* \*